US012210631B1

(12) United States Patent
Hunt-Schroeder et al.

(10) Patent No.: US 12,210,631 B1
(45) Date of Patent: Jan. 28, 2025

(54) METHOD AND APPARATUS FOR SELF-DESTRUCTION OF DEVICE PROTECTED BY A PHYSICAL UNCLONABLE FUNCTION GENERATOR

(71) Applicant: Marvell Asia Pte Ltd, Singapore (SG)

(72) Inventors: Eric Hunt-Schroeder, Essex Junction, VT (US); Tian Xia, Burlington, VT (US)

(73) Assignees: Marvell Asia Pte Ltd, Singapore (SG); University of Vermont and State Agricultural College, Burlington, VT (US)

( * ) Notice: Subject to any disclaimer, the term of this patent is extended or adjusted under 35 U.S.C. 154(b) by 19 days.

(21) Appl. No.: 17/743,797

(22) Filed: May 13, 2022

Related U.S. Application Data

(60) Provisional application No. 63/308,476, filed on Feb. 9, 2022.

(51) Int. Cl.
*G06F 21/60* (2013.01)
*H03K 3/037* (2006.01)
(Continued)

(52) U.S. Cl.
CPC ............ *G06F 21/60* (2013.01); *H04L 9/3278* (2013.01); *H03K 3/037* (2013.01); *H03K 17/60* (2013.01)

(58) Field of Classification Search
CPC ....... G06F 21/60; H04L 9/3278; H03K 3/037; H03K 17/60
See application file for complete search history.

(56) References Cited

U.S. PATENT DOCUMENTS 5,515,540 A * 5/1996 Grider ..................... G06F 21/75
713/300
5,736,777 A * 4/1998 Shield ................... H01L 23/576
438/467

(Continued)

FOREIGN PATENT DOCUMENTS

CN 205281504 U * 6/2016
JP 2017163030 A * 9/2017

OTHER PUBLICATIONS

Herder, C., et al., "Physical Unclonable Functions and Applications: A Tutorial," *2014 Proceedings of the IEEE*, vol. 102, No. 8 pp. 1126-1141 (Aug. 8, 2014).

(Continued)

*Primary Examiner* — Theodore C Parsons

(57) ABSTRACT

A method for preventing unauthorized access to information in a semiconductor device that is secured with a security protocol that uses a first portion of the information may include in response to a verified inaccessibility-inducing signal, unlocking safety lock circuitry which is operable to prevent unintentional activation of self-destruction in the semiconductor device, and initiating the self-destruction of at least a portion of the semiconductor device. A semiconductor device is configured to prevent unauthorized access to information available therein that is secured with a security protocol that uses a first portion of the information. The semiconductor device may include safety lock circuitry operable to prevent unintentional activation of self-destruction in the semiconductor device and control circuitry operable to unlock the safety lock circuitry and to initiate the self-destruction of at least a portion of the semiconductor device in response to a verified inaccessibility-inducing signal.

26 Claims, 7 Drawing Sheets

(51) Int. Cl.
*H03K 17/60* (2006.01)
*H04L 9/32* (2006.01)

(56) References Cited

U.S. PATENT DOCUMENTS

| | | | |
|---|---|---|---|
| 6,588,672 B1* | 7/2003 | Usami | H01L 23/576 |
| | | | 235/492 |
| 2012/0179952 A1 | 7/2012 | Tuyls et al. | |
| 2015/0092777 A1 | 4/2015 | Watanabe | |
| 2017/0142082 A1 | 5/2017 | Qian | |
| 2017/0142090 A1 | 5/2017 | Mahaffey et al. | |
| 2017/0201382 A1 | 7/2017 | Lindteigen | |
| 2018/0013562 A1 | 1/2018 | Haider et al. | |
| 2018/0075262 A1 | 3/2018 | Auh | |
| 2018/0137293 A1 | 5/2018 | Lucas et al. | |
| 2018/0159685 A1 | 6/2018 | Kwak | |
| 2018/0278418 A1 | 9/2018 | Chang et al. | |
| 2019/0140851 A1 | 5/2019 | Ma et al. | |
| 2019/0221254 A1 | 7/2019 | Liu et al. | |
| 2020/0136839 A1 | 4/2020 | Tsai et al. | |
| 2020/0350264 A1* | 11/2020 | Park | H01L 23/576 |
| 2022/0191223 A1* | 6/2022 | Zifroni | G06F 21/567 |

OTHER PUBLICATIONS

Hunt-Schroeder, E., et al., "Pre-Amplifier Based Entropy Source with Stable Output for use in a Physical Unclonable Function," *2021 IEEE Microelectronics Design & Test Symposium (MDTS)*, pp. 1-6 (May 18-21, 2021).

Hunt-Schroeder, E., et al., "Integrating Physical Unclonable Function and Self-Destruction Design to Safeguard Integrated Circuit," *GOMACTech 2022*, pp. 1-6 (Mar. 21-24, 2022).

* cited by examiner

METHOD AND APPARATUS FOR SELF-DESTRUCTION OF DEVICE PROTECTED BY A PHYSICAL UNCLONABLE FUNCTION GENERATOR

CROSS REFERENCE TO RELATED APPLICATION

This disclosure claims the benefit of commonly-assigned U.S. Provisional Patent Application No. 63/308,476, filed Feb. 9, 2022, which is hereby incorporated by reference herein in its entirety.

FIELD OF USE

This disclosure relates to a semiconductor device protected by a physical unclonable function generator. More particularly, this disclosure relates to method and apparatus for inducing self-destruction to cause damage to an entropy source of the physical unclonable function generator and/or a different component of the semiconductor device to prevent unauthorized access to secured information.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Many semiconductor devices use cryptographically secure keys for device security. In accordance with accepted industry and government standards, such as those promulgated in the United States by the National Institute of Standards and Technology (NIST), such a key (sometimes referred to as a "unique device secret" or "UDS") should be random (i.e., impossible or nearly impossible to predict, also referred to as "unclonable"), unique (i.e., different on every device), and stable (i.e., should never change on any one device notwithstanding changes in process conditions, voltage, temperature, age, etc.).

A security protocol implemented to secure or protect a semiconductor device becomes a target for measures to defeat or circumvent the security protocol. The measures may involve probing, repeated testing or experimentation, or other actions intended to gain knowledge about the security protocol. The semiconductor device may or may not know these measures are being tried. The measures may be tried over a short period or over a long period.

SUMMARY

A method according to implementations of the subject matter of this disclosure, for preventing unauthorized access to information in a semiconductor device that is secured with a security protocol that uses a first portion of the information, may include in response to a verified inaccessibility-inducing signal, unlocking safety lock circuitry which is operable to prevent unintentional activation of self-destruction in the semiconductor device, and initiating the self-destruction of at least a portion of the semiconductor device.

In a first implementation of such a method, unlocking the safety lock circuitry in response to the verified inaccessibility-inducing signal may include unlocking the safety lock circuitry in response to a signal indicative of tampering in the semiconductor device having been detected.

In a second implementation of such a method, unlocking the safety lock circuitry in response to the verified inaccessibility-inducing signal may include unlocking the safety lock circuitry in response to an external command received by the semiconductor device to render the information inaccessible.

In a third implementation of such a method, the semiconductor device may include an entropy source operable to provide the first portion of the information which is necessary to execute the security protocol, and initiating the self-destruction may include inducing a failure mode of the entropy source to prevent performance of one or more read operations directed to the first portion of the information.

In a first aspect of that third implementation, inducing the failure mode may include inducing electromigration in the entropy source to damage at least one bitline of at least one bitline pair of the entropy source to prevent performance of the one or more read operations directed to the first portion of the information.

In a first instance of that first aspect of the third implementation, inducing the electromigration in the entropy source is performed on the at least one bitline pair of the entropy source by one or more bitcells and sense amplifier circuitry of the entropy source, inducing the electromigration in the entropy source renders the entropy source inoperative to entirely provide the first portion of the information which is necessary to execute the security protocol to permit access to the semiconductor device, and inducing the electromigration in the entropy source is performed without damaging the entirety of the semiconductor device.

In a first variant of that first instance of the first aspect of the third implementation, inducing the electromigration in the entropy source is further performed on the at least one bitline pair by a plurality of pull-down transistors of the entropy source in coordination with the one or more bitcells and the sense amplifier circuitry, and inducing the electromigration may include generating a current above a damage threshold and sustaining the current above the damage threshold for at least a threshold duration to damage the at least one bitline of the at least one bitline pair that connects the one or more bitcells and the sense amplifier circuitry.

In a fourth implementation of such a method, initiating the self-destruction may include inducing latch-up in the semiconductor device, by creating a self-sustaining positive feedback loop between power and ground lines of the semiconductor device, sending a current between the power and ground lines of the semiconductor device through the self-sustaining positive feedback loop, and uncontrollably increasing the current to heat the semiconductor device and to exceed a current tolerance threshold of the semiconductor device to damage at least one of the power or ground lines.

In a first aspect of that fourth implementation, inducing the latch-up in the semiconductor device may include rendering the semiconductor device inoperative due to at least one of the power or ground lines having been damaged.

In a second aspect of that fourth implementation, inducing the latch-up in the semiconductor device may include using latch-up inducing circuitry of the semiconductor device to create the self-sustaining positive feedback loop between the power and ground lines of the semiconductor device, to send the current between the power and ground lines through the self-sustaining positive feedback loop, and to uncontrollably increase the current to heat the semiconductor device and to exceed the current tolerance threshold of the semiconductor device.

In a fifth implementation of such a method, initiating the self-destruction may include damaging the first portion of the information, the first portion of the information may include physical unclonable function information that represents random and unique unstored bits obtainable from variation in semiconductor component intrinsic properties due to semiconductor fabrication processes, the physical unclonable function information being necessary to execute the security protocol, and a second portion of the information is rendered inaccessible due to the physical unclonable function information having been damaged.

In a sixth implementation of such a method, initiating the self-destruction may include causing the information to be permanently inaccessible by rendering the semiconductor device inoperative to power up and to perform at least one operation due to damage to a power grid of the semiconductor device.

According to implementations of the subject matter of this disclosure, a semiconductor device is configured to prevent unauthorized access to information available therein that is secured with a security protocol that uses a first portion of the information. The semiconductor device may include safety lock circuitry operable to prevent unintentional activation of self-destruction in the semiconductor device and control circuitry operable to unlock the safety lock circuitry and to initiate the self-destruction of at least a portion of the semiconductor device in response to a verified inaccessibility-inducing signal.

In a first implementation of such a semiconductor device, the verified inaccessibility-inducing signal may include a signal indicative of tampering in the semiconductor device having been detected.

In a second implementation of such a semiconductor device, the verified inaccessibility-inducing signal may include an external command received by the semiconductor device to render the information inaccessible.

A third implementation of such a semiconductor device may include an entropy source operable to provide the first portion of the information which is necessary to execute the security protocol, the control circuitry is operable to initiate the self-destruction by inducing a failure mode of the entropy source to prevent performance of one or more read operations directed to the first portion of the information.

In a first aspect of that third implementation, the control circuitry is operable to induce the failure mode of the entropy source by inducing electromigration in the entropy source to damage at least one bitline of at least one bitline pair of the entropy source to prevent performance of the one or more read operations directed to the first portion of the information.

In a first instance of that first aspect of the third implementation, the control circuitry is operable to induce the electromigration in the entropy source by performance of the electromigration on the at least one bitline pair of the entropy source by one or more bitcells and sense amplifier circuitry of the entropy source, the control circuitry is operable to induce the electromigration to render the entropy source inoperative to entirely provide the first portion of the information which is necessary to execute the security protocol to permit access to the semiconductor device, and the control circuitry is operable to induce the electromigration in the entropy source without damaging the entirety of the semiconductor device.

In a first variant of that first instance of the first aspect of the third implementation, the control circuitry is operable to induce the electromigration in the entropy source by further performance of the electromigration on the at least one bitline pair by a plurality of pull-down transistors of the entropy source in coordination with the one or more bitcells and the sense amplifier circuitry, by causing generation of a current above a damage threshold and causing the current to be sustained above the damage threshold for at least a threshold duration to damage the at least one bitline of the at least one bitline pair that connects the one or more bitcells and the sense amplifier circuitry.

In a fourth implementation of such a semiconductor device, the control circuitry is operable to initiate the self-destruction by inducing latch-up in the semiconductor device, by causing creation of a self-sustaining positive feedback loop between power and ground lines of the semiconductor device, causing a current to be sent between the power and ground lines of the semiconductor device through the self-sustaining positive feedback loop, and causing the current to uncontrollably increase to heat the semiconductor device and to exceed a current tolerance threshold of the semiconductor device to damage at least one of the power or ground lines.

In a first aspect of that fourth implementation, the control circuitry is operable to induce the latch-up to render the semiconductor device inoperative due to at least one of the power or ground lines having been damaged.

A second aspect of that fourth implementation, may include latch-up inducing circuitry operable to create the self-sustaining positive feedback loop between the power and ground lines of the semiconductor device, to send the current between the power and ground lines through the self-sustaining positive feedback loop, and to uncontrollably increase the current to heat the semiconductor device and to exceed the current tolerance threshold of the semiconductor device, the control circuitry is operable to use the latch-up inducing circuitry, and the latch-up inducing circuitry may include a PNP bipolar junction transistor and a NPN bipolar junction transistor in a loop arrangement, a first biasing circuitry operable to receive control signals, to bias the PNP bipolar junction transistor in an inactive state, and to bias the PNP bipolar junction transistor in an active state to induce the latch-up, and a second biasing circuitry operable to receive the control signals, to bias the NPN bipolar junction transistor in the inactive state, and to bias the NPN bipolar junction transistor in the active state to induce the latch-up.

In a fifth implementation of such a semiconductor device, the first portion of the information is damaged by the self-destruction, the first portion of the information may include physical unclonable function information that represents random and unique unstored bits obtainable from variation in semiconductor component intrinsic properties due to semiconductor fabrication processes, the physical unclonable function information being necessary to execute the security protocol, and a second portion of the information is rendered inaccessible due to the physical unclonable function information having been damaged.

In a sixth implementation of such a semiconductor device, the information is made permanently inaccessible by the self-destruction by rendering the semiconductor device inoperative to power up and to perform at least one operation due to damage to a power grid of the semiconductor device.

In a seventh implementation of such a semiconductor device, the safety lock circuitry may include (i) multi-stage ring oscillator circuitry operable to generate a plurality of pulses, the multi-stage ring oscillator circuitry may include enable circuitry operable to receive the plurality of pulses and a first control signal, (ii) a first plurality of power on zero (POZ) latches positioned in a first series arrangement operable to receive the plurality of pulses and to generate a first plurality of output values, (iii) a second plurality of POZ latches positioned in a second series arrangement operable to receive a clock signal and an activate self-destruction signal and to generate a second plurality of output values, (iv) first circuitry operable to receive the first plurality of output values and to generate the first control signal to couple to the enable circuitry of the multi-stage ring oscillator circuitry and to respective reset terminals of the second plurality of POZ latches, and (v) second circuitry operable to receive the second plurality of output values and to generate an unlock signal, the second circuitry is operable to set the unlock signal to an unlock value in response to the activate self-destruction signal being a first value for a plurality of clock cycles of the clock signal in the second plurality of POZ latches and the respective reset terminals of the second plurality of POZ latches being inactive.

According to implementations of the subject matter of this disclosure, a semiconductor device is configured to prevent unauthorized access to information available therein that is secured with a security protocol that uses a first portion of the information. The semiconductor device may include (i) a power grid, (ii) an entropy source operable to provide the first portion of the information which is necessary to execute the security protocol, (iii) at least one of electromigration-inducing circuitry or latch-up inducing circuitry to cause self-destruction in the semiconductor device, the electromigration-inducing circuitry is operable to damage the entropy source to prevent performance of one or more read operations and to render the entropy source inoperative to entirely provide the first portion of the information which is necessary to execute the security protocol to permit access to the semiconductor device, and the latch-up inducing circuitry is operable to damage the power grid and to render the semiconductor device inoperative to power up and to perform at least one operation, (iv) safety lock circuitry operable to prevent unintentional activation of the at least one of electromigration-inducing circuitry or latch-up inducing circuitry to perform the self-destruction in the semiconductor device, and (v) control circuitry operable to unlock the safety lock circuitry in response to a verified inaccessibility-inducing signal.

A bitcell according to implementations of the subject matter of this disclosure, for an entropy source which provides physical unclonable function information in a semiconductor device, may include (i) a differential transistor pair coupled to a bitline, a bitline complement, and a wordline, the differential transistor pair is operable to sink a first current from the bitline and to sink a second current from the bitline complement, (ii) a voltage difference stage coupled to the differential transistor pair, the bitline, and the bitline complement, the voltage difference stage is operable to set a bitline voltage at the bitline based on the first current and is operable to set a bitline complement voltage at the bitline complement based on the second current to create a voltage difference, (iii) an amplifying stage coupled to the voltage difference stage, the bitline, and the bitline complement, the amplifying stage is operable to amplify the voltage difference by changing the bitline voltage and the bitline complement voltage to increase the voltage difference to indicate one of a logic 0 or a logic 1, and (iv) a bitcell selection transistor coupled to the voltage difference stage and the amplifying stage, the bitcell selection transistor is operable to receive a control signal for a read operation.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
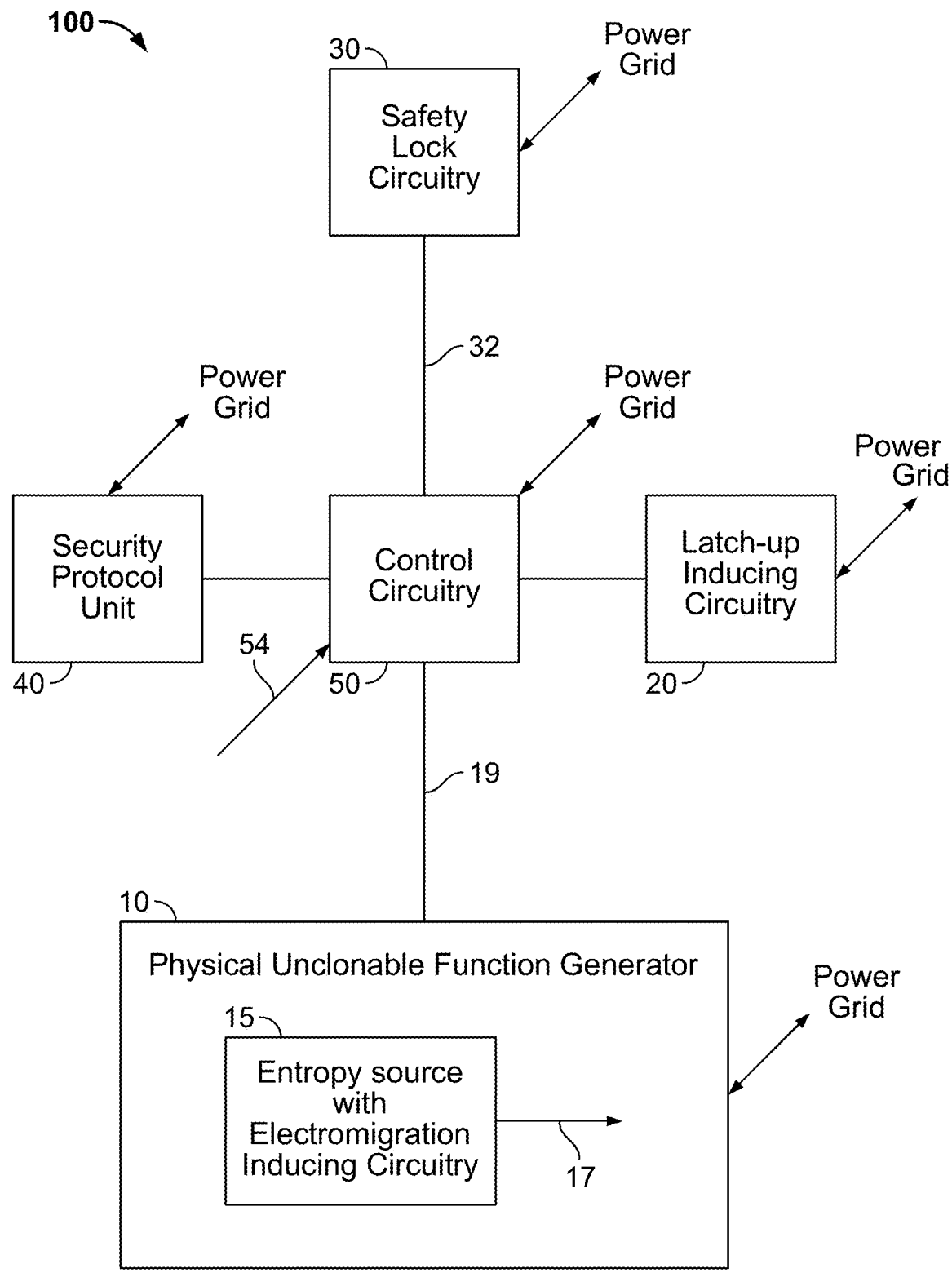
FIG. 1 is a block diagram of an overall architecture in accordance with implementations of the subject matter of this disclosure for inducing self-destruction in a semiconductor device to cause damage to prevent unauthorized access to secured information.

In accordance with implementations of the subject matter of this disclosure, a semiconductor device protected by a physical unclonable function generator is provided effective countermeasures to respond to a security attack or a successful unauthorized intrusion to still protect secured information stored in the semiconductor device, which is any type of information with an access restriction and with protection by a security protocol. The effective countermeasures provided by these implementations may employ what are normally considered failure mechanisms of a semiconductor environment, including electromigration and latch-up.

Electromigration refers to a gradual degradation of metal interconnects due to combined effects of current and temperature. Latch-up is self-sustaining and, within a relatively short period of time, results in a short-circuit event between a power line and a ground line that is irreversible and catastrophic. Typically, semiconductor design rules focus on preventing electromigration and latch-up in the semiconductor design.

However, in a semiconductor device according to implementations of the subject matter of this disclosure, mechanisms may be provided to intentionally induce electromigration, or latch-up, or both, to render the semiconductor device useless. Whether electromigration, latch-up, or both electromigration and latch-up, are induced in the semiconductor device may depend on the degree of damage needed to defend against an attack on the semiconductor device.

In implementations of the subject matter of this disclosure in which electromigration is included as an intentional failure mode of the semiconductor device, electromigration-inducing circuitry may be included in the semiconductor device. Electromigration is employed to damage a sufficient portion of the semiconductor device to render the semiconductor device unusable. In implementations where a physical unclonable function generator is provided in the semiconductor device to generate a unique device secret key necessary to successfully execute a security protocol of the semiconductor device, the physical unclonable function generator may be the portion targeted for damage.

An entropy source of the physical unclonable function generator may provide a sequence of physical unclonable function information, e.g., a sequence of bits that is random, unique, and stable. The physical unclonable function generator then generates the unique device secret key based on the sequence of physical unclonable function information. The electromigration-inducing circuitry may be integrated into the entropy source. If the electromigration-inducing circuitry is activated, the electromigration-inducing circuitry will damage the entropy source. The damaged entropy source will be inoperative to provide the entire sequence of physical unclonable function information. If the sequence of physical unclonable function information is missing one or more bits, the sequence of physical unclonable function information will be useless. Consequently, the physical unclonable function generator will be unable to generate the correct unique device secret key necessary to successfully execute the security protocol, e.g., authentication, of the semiconductor device, ensuring unsuccessful execution of the security protocol and preventing access to the secured information of the semiconductor device.

The entropy source may include bitcells having an amplifying structure and sense amplifier circuitry. Each bitcell may be readable as a bit value, e.g., logic 0 or logic 1. The sense amplifier circuitry may read the bit values from the bitcells. In accordance with implementations of the subject matter of this disclosure, one or more bitcells and the sense amplifier circuitry also may function as the electromigration-inducing circuitry. Circuitry of the bitcells and the sense amplifier circuitry may be repurposed to induce electromigration in the entropy source. That is, the bitcells and the sense amplifier circuitry may perform multiple tasks in the entropy source. These tasks include not only reading bit values, e.g., logic 0 or logic 1, but also inducing electromigration.

Latch-up is characterized by global damage to the semiconductor device, e.g., damage to multiple regions and/or components of the semiconductor device. The semiconductor device may include latch-up inducing circuitry in accordance with implementations of the subject matter of this disclosure. If the latch-up inducing circuitry is activated, the latch-up inducing circuitry may damage a power grid of the semiconductor device. Consequently, the semiconductor device will be rendered inoperative—unable to power up or to perform any operations because of damage to the power grid. This will prevent access to the secured information of the semiconductor device.

In accordance with implementations of the subject matter of this disclosure, the semiconductor device may be provided with protection against unintended self-destruction. For example, the semiconductor device may include safety lock circuitry to prevent unintentional activation of self-destruction via inducement of either electromigration or latch-up in the semiconductor device. If such safety lock circuitry is provided, the safety lock circuitry may be unlocked in response to a verified inaccessibility-inducing signal, which may be a signal indicative of the detection of tampering—e.g., a security attack or successful unauthorized intrusion—in the semiconductor device, or may be an external command received by the semiconductor device to render the secured information inaccessible in the semiconductor device.

The subject matter of this disclosure may be better understood by reference to FIGS. 1-7.

FIG. 1 is a block diagram of an overall architecture 100 in accordance with implementations of the subject matter of this disclosure for inducing self-destruction in a semiconductor device to cause damage to prevent unauthorized access to secured information.

The overall architecture 100 may include a physical unclonable function generator 10, a security protocol unit 40, and control circuitry 50. The overall architecture 100 may also include electromigration-inducing circuitry. The electromigration-inducing circuitry may be located in the physical unclonable function generator 10 or may be located in any other component of the overall architecture 100. Additionally, the overall architecture 100 may also include latch-up inducing circuitry 20 and safety lock circuitry 30. As depicted in FIG. 1, the components of the overall architecture 100 depend on the power grid of the semiconductor device. Alternatively, the components of the overall architecture 100 may be arranged differently by combining or dividing the components shown in FIG. 1 or by excluding one or more components shown in FIG. 1.

The physical unclonable function generator 10 may include an entropy source 15. The entropy source 15 may include electromigration-inducing circuitry. The physical unclonable function generator 10 is operable to generate a unique device secret key 19 necessary to successfully execute the security protocol in the security protocol unit 40 of the semiconductor device. However, the unique device secret key 19 is not stored, but generated and supplied whenever requested to execute the security protocol. Rather, as described in copending, commonly-assigned U.S. patent application Ser. No. 17/305,825, filed Jul. 15, 2021, which is hereby incorporated by reference herein in its entirety, the entropy source 15 is operable to provide a sequence of physical unclonable function information 17, e.g., a sequence of bits that is random, unique, and stable. The physical unclonable function generator 10 then generates the unique device secret key 19 based on the sequence of physical unclonable function information 17. More particularly, the physical unclonable function information 17 represents random and unique unstored bits obtainable from variation in semiconductor component intrinsic properties due to semiconductor fabrication processes and is stable. If the electromigration-inducing circuitry of the entropy source 15 is activated, the electromigration-inducing circuitry damages the entropy source 15. The damaged entropy source 15 is then inoperative to provide the entire sequence of physical unclonable function information. If the sequence of physical unclonable function information is missing one or more bits, the sequence of physical unclonable function information is useless. Consequently, the physical unclonable function generator 10 incorrectly generates the unique device secret key 19 necessary to successfully execute the security protocol of the semiconductor device, ensuring unsuccessful execution of the security protocol and preventing access to the secured information of the semiconductor device.

The latch-up inducing circuitry 20 may be provided to induce latch-up in the semiconductor device. In accordance with implementations of the subject matter of this disclosure, the latch-up inducing circuitry 20 creates a self-sustaining positive feedback loop between power and ground lines of the semiconductor device, sends a current between the power and ground lines through the self-sustaining positive feedback loop, and uncontrollably increases the current to heat the semiconductor device and to exceed the current tolerance threshold of the semiconductor device. As a result, the latch-up inducing circuitry 20 renders the semiconductor device inoperative because at least one of the power or ground lines of a power grid of the semiconductor device is damaged. Moreover, the secured information of the semiconductor device is made permanently inaccessible by rendering the semiconductor device inoperative to power up or to perform any operations because of damage to the power grid of the semiconductor device.

The safety lock circuitry 30 shown in FIG. 1 may be provided to prevent unintentional activation of self-destruction via inducement of either electromigration or latch-up in the semiconductor device. The safety lock circuitry 30 outputs a lock control signal 32 to indicate a locked state or an unlocked state. The lock control signal 32 may include a signal or a plurality of signals. If the lock control signal 32 is in the locked state, neither electromigration nor latch-up may be performed. If the lock control signal 32 is in the unlocked state, electromigration or latch-up, or both in a sequential manner, may be performed.

The security protocol unit 40 is operable to perform a security protocol. In accordance with implementations of the subject matter of this disclosure, the security protocol carries out authentication after power boot or power reset to permit access to secured information of the semiconductor device, e.g., firmware, software, data in memory, etc. The security protocol unit 40 receives the unique device secret key 19 generated by the physical unclonable function generator 10. The unique device secret key 19 is necessary to successfully execute authentication for the semiconductor device to permit access to the secured information of the semiconductor device. The authentication may be performed to enable access by a software process, another device, a user, etc.

The control circuitry 50 is operable to provide one or more control signals to initiate self-destruction in the semiconductor device by the inducement of electromigration or latch-up in response to an inaccessibility-inducing signal 54. The control circuitry 50 may initiate self-destruction by unlocking the safety lock circuitry 30. Moreover, the control circuitry 50 may derive the one or more control signals from the lock control signal 32 of the safety lock circuitry 30. In addition, the control circuitry 50 interfaces and interacts with the other components of the overall architecture 100. For security purposes, the control circuitry 50 verifies the inaccessibility-inducing signal 54 to ensure legitimacy and correctness of the inaccessibility-inducing signal 54. If the verification is successful, the control circuitry 50 proceeds with unlocking the safety lock circuitry 30 and with initiating self-destruction in the semiconductor device. Otherwise, the control circuitry 50 ignores the inaccessibility-inducing signal 54. In accordance with implementations of the subject matter of this disclosure, the inaccessibility-inducing signal 54 may be a signal indicative of tampering, e.g., security attack or successful unauthorized intrusion, in the semiconductor device being detected, e.g., by tamper detection circuitry, or may be an external command received, e.g., by wireless communication or by wired communication, by the semiconductor device to render inaccessible any secured information in the semiconductor device.

Even if an unauthorized intruder manages to penetrate the security protocol of the semiconductor device or gains unauthorized access through another manner to the semiconductor device, the unauthorized intruder requires time defined by multiple clock cycles of the semiconductor device to investigate and discover useful information. However, self-destruction by the inducement of electromigration or latch-up in accordance with implementations of the subject matter of this disclosure may be completed in a shorter period of time, e.g., a period of time measured in nanoseconds. Consequently, the unauthorized intruder will not have sufficient time—even after succeeding in breaching the device security—to effectively penetrate the semiconductor device or access secured information before the electromigration or latch-up sufficiently damages the semiconductor device.

As mentioned above, the inducement of electromigration, latch-up, or both may be performed to damage the semiconductor device. The selection of one self-destruction mode or the other may be determined based on the damage to the semiconductor device that is needed to thwart the detected attack. However, other factors may be considered in the selection of the self-destruction mode. The other factors may include pre-established preferences, default settings, value of any secured information in the semiconductor device, in-progress operations with security implications, amount of power available, power source, etc.

Latch-up may require more power than electromigration. Accordingly, electromigration is more suitable in situations where available power is at low levels or where there is uncertainty concerning the ability of the power source, e.g., battery or power supply, to deliver sufficient power to successfully damage the semiconductor device to prevent unauthorized access to the secured information of the semiconductor device.

Figure 2:
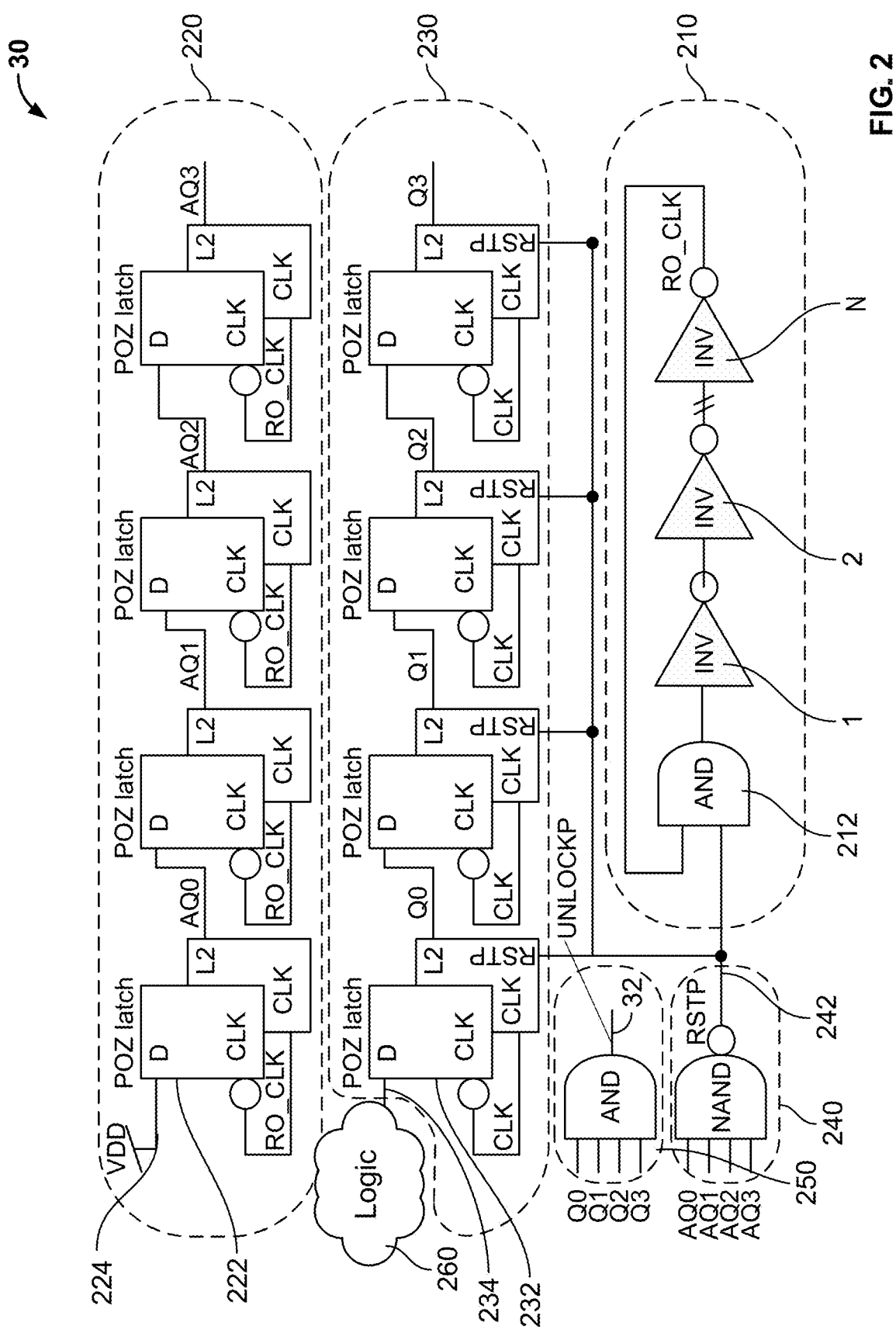
FIG. 2 depicts a schematic representation of the safety lock circuitry of FIG. 1 in accordance with implementations of the subject matter of this disclosure.

FIG. 2 depicts a schematic representation of the safety lock circuitry 30 of FIG. 1 in accordance with implementations of the subject matter of this disclosure. The safety lock circuitry 30 utilizes power on zero (POZ) latches, which are latches designed and developed to statistically favor a known state, e.g., logic 0, during power up. POZ latches are specifically tuned to account for variations in power supply slew rate, mismatch in transistors, and coupling between transistors and interconnects. POZ latches will statistically power up to the known state of logic 0, but it is not guaranteed.

When incorporating the capability of self-destruction by inducing electromigration or latch-up in the semiconductor device, there exists a risk self-destruction may be unintentionally activated. During power up, non-POZ latches power up to an unknown state due to mismatches in the transistors, power supply slew ramp rates, coupling between nodes, or glitches on input or clock signals. This poses a serious risk of unintentional activation of self-destruction during the semiconductor device power up before logic of the semiconductor device has been initialized and stabilized. Another possible scenario is that a non-POZ latch may experience a single-event upset (SEU) from an ionization participle striking the non-POZ latch and flipping the data of the non-POZ latch, accidentally activating self-destruction in the semiconductor device.

The safety lock circuitry 30 provides a solution to the problem of unintentional activation of self-destruction in the semiconductor device. In accordance with implementations of the subject matter of this disclosure, the safety lock circuitry 30 may include a multi-stage ring oscillator circuitry 210 with N stages, a first series arrangement 220 of power on zero (POZ) latches 222, a second series arrangement 230 of POZ latches 232, a reset circuitry 240, and a lock control signal circuitry 250. The multi-stage ring oscillator circuitry 210 includes an enable circuitry 212. The components of the safety lock circuitry 30 may have configurations that are different from those shown in FIG. 2. The multi-stage ring oscillator circuitry 210 may have twenty-one stages or may have any selected number of stages. Also, the first series arrangement 220 and the second series arrangement 230 may have four POZ latches or may have any selected number of POZ latches.

The safety lock circuitry 30 operates as follows during the semiconductor device power up. Each of the POZ latches 222,232 ideally powers up to the favored known state of logic 0. However, a logic cloud 260, which represents one or more components of the overall architecture 100 of FIG. 1, couples an unknown signal value to input 234 of the second series arrangement 230 of POZ latches 232. In contrast, input 224 of the first series arrangement 220 of POZ latches 222 receives a logic 1, which is a known signal value. Meanwhile, the reset circuitry 240 outputs a RSTP signal 242 with a value of logic 1 since at least one of the POZ latches 222 powers up to the favored known state of logic 0, enabling the multi-stage ring oscillator circuitry 210. The RSTP signal 242 is also coupled to reset terminals RSTP of the POZ latches 232 to reset and to force the POZ latches 232 to logic 0 regardless of the states of the logic cloud 260 and a clock signal CLK during the power up. Consequently, the lock control signal circuitry 250 outputs the lock control signal 32 (also in FIG. 1) with a value of logic 0, locking self-destruction in the semiconductor device. It should be noted the lock control signal 32 is also labelled UNLOCKP in FIG. 2. While the multi-stage ring oscillator circuitry 210 is running, a clock RO_CLK with pulses is created and is used to provide a logic 1 through the input 224 into the POZ latches 222. After four successive clock RO_CLK pulses, the POZ latches 222 have a state of logic 1, which causes the reset circuitry 240 to output the RSTP signal 242 with a value of logic 0. Additionally, the multi-stage ring oscillator circuitry 210 is disabled while the reset terminals RSTP of the POZ latches 232 become inactive because the RSTP signal 242 has the value of logic 0.

Since the power up routine for the safety lock circuitry 30 is now complete, the safety lock circuitry 30 may be unlocked. For example, the control circuitry 50 of FIG. 1 in the logic cloud 260 feeds an activate self-destruction signal with a value of logic 1 into the input 234 of the second series arrangement 230 of POZ latches 232. If the activate self-destruction signal with the value of logic 1 is loaded for four successive clock cycles of the clock signal CLK, the lock control signal circuitry 250 outputs the lock control signal 32 with a value of logic 1, unlocking self-destruction in the semiconductor device. Thereby, inducement of electromigration, latch-up, or both may be performed to damage the semiconductor device.

As noted above, the entropy source 15 of FIG. 1 includes bitcells, which have an amplifying structure, and sense amplifier circuitry, where both components are configured to perform multiple tasks in the entropy source 15. These tasks may include reading bit values, e.g., logic 0 or logic 1, that represent physical unclonable function information and inducing electromigration to damage the entropy source 15 if self-destruction in the semiconductor device is initiated.

Figure 3:
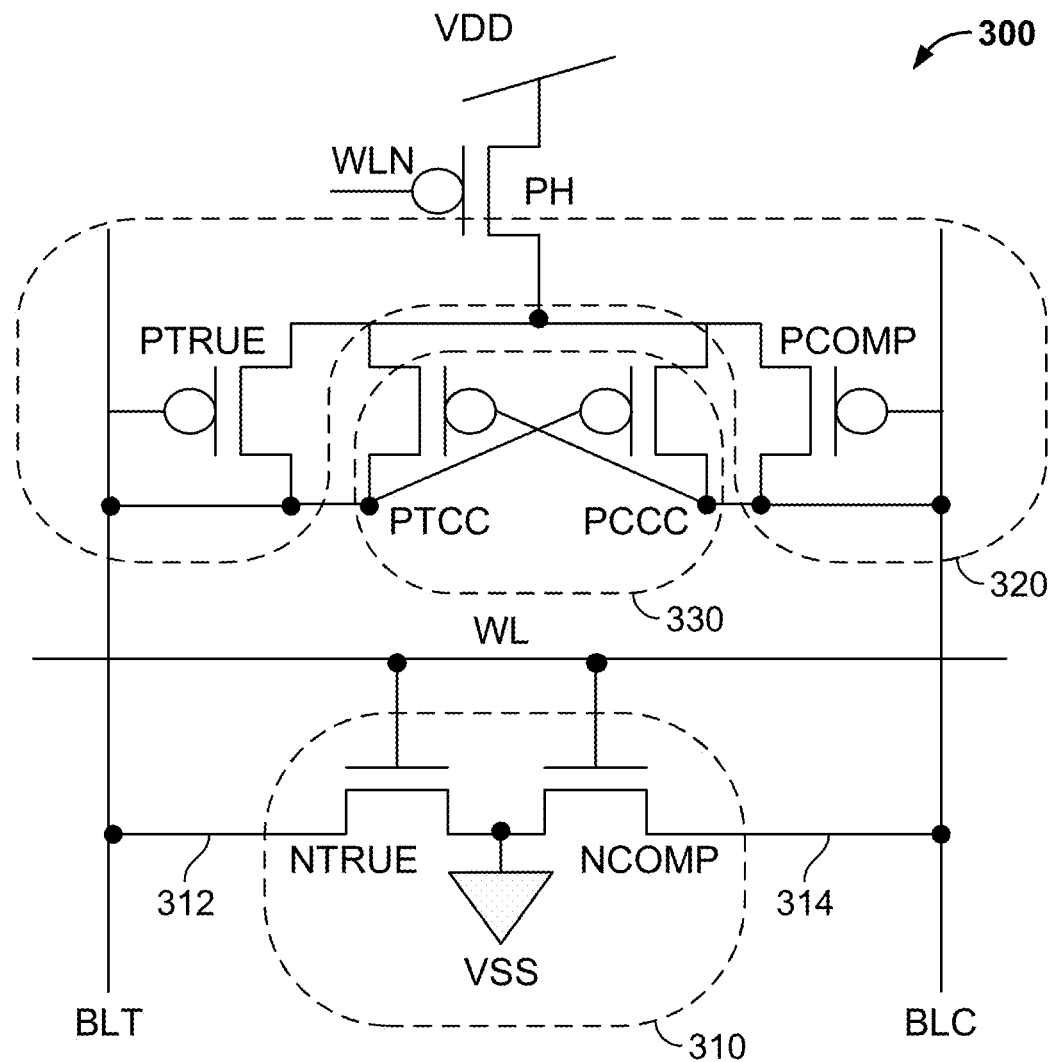
FIG. 3 is a schematic representation of a bitcell having an amplifying structure for the entropy source of FIG. 1 in accordance with implementations of the subject matter of this disclosure.

FIG. 3 is a schematic representation of a bitcell 300 having an amplifying structure ("bitcell") for the entropy source 15 of FIG. 1 in accordance with implementations of the subject matter of this disclosure. The bitcell 300 is compatible with and suitable for arrangement in an array structure including multiple bitline columns and multiple wordline rows. Each bitline column and each wordline row may include numerous bitcells, where each bitcell may include the bitcell 300 shown in FIG. 3. Each bitline column may be coupled to sense amplifier circuitry. Instead of being configured to store a readable bit, e.g., logic 0 or logic 1, by altering an intrinsic property, e.g., charge, magnetism, spin, resistance, capacitance, inductance, etc., the bitcell 300 utilizes component intrinsic properties to supply a readable bit, e.g., logic 0 or logic 1.

The bitcell 300 may include a differential transistor pair 310, a voltage difference stage 320, an amplifying stage 330, and a bitcell selection transistor PH. It should be understood the n-type metal-oxide semiconductor field-effect transistors (NMOSFETS or NFETS) shown in FIG. 3 may be replaced with p-type metal-oxide semiconductor field-effect transistors (PMOSFETS or PFETS) while the PMOSFETS shown in FIG. 3 may be replaced with NMOSFETS in a complementary design.

Bitcell 300 operates as follows during a read operation. Due to semiconductor fabrication process variation, NFET transistor NTRUE and NFET transistor NCOMP of the differential transistor pair 310 exhibit intrinsic parameter variations that are sensed to define a bit value, e.g., logic 0 or logic 1, for the bitcell 300. For reading the bitcell 300, a control signal WLN swings from VDD (inactive) to VSS (active), whereas a wordline WL swings from VSS (inactive) to a read voltage (active). Reading the bitcell 300 begins by activating the wordline WL, which is coupled to the NFET transistor NTRUE and the NFET transistor NCOMP, to the read voltage that tracks a mean threshold voltage of the NFET transistor NTRUE and the NFET transistor NCOMP with process, voltage, and temperature. The dominant factor in determining the bit value for the bitcell 300 is the mismatch of the NFET transistor NTRUE and the NFET transistor NCOMP. Next, the control signal WLN coupled to the bitcell selection transistor PH, which is a PFET, is activated with a logic 0 to select the bitcell 300 in a bitline column for the read operation. The NFET transistor NTRUE sinks a read current 312 from a bitline true BLT to VSS, which is ground, while the NFET transistor NCOMP sinks a read current 314 from a bitline complement BLC to VSS. PFET transistor PTRUE and PFET transistor PCOMP of the voltage difference stage 320 are sized to respond to the read current 312 and the read current 314 and to set a BLT voltage of the bitline true BLT and a BLC voltage of the bitline complement BLC based on an overdrive required to supply current, creating a differential voltage between the bitline true BLT and the bitline complement BLC. The PFET transistor PTRUE and the PFET transistor PCOMP are configured as diodes.

Further, PFET transistor PTCC and PFET transistor PCCC of the amplifying stage 330 pull the BLT voltage of the bitline true BLT and the BLC voltage of the bitline complement BLC apart and amplify the differential voltage between the bitline true BLT and the bitline complement BLC. After some settling time, the BLT voltage of the bitline true BLT and the BLC voltage of the bitline complement BLC approach their DC operating points, and no further signal develops along the bitline true BLT and the bitline complement BLC. At this time, sense amplifier circuitry (FIG. 4) is used for determining one of a logic 0 or a logic 1 for the bitcell 300. The PFET transistor PTCC and the PFET transistor PCCC are in a cross-coupled configuration.

The bitcell 300 has a high gain and delivers a stable bit value across varying conditions since the bitcell 300 takes a relatively small differential current from the NFET transistor NTRUE and the NFET transistor NCOMP and outputs the BLT voltage of the bitline true BLT and the BLC voltage of the bitline complement BLC with dozens of millivolts of differential voltage.

Figure 4:
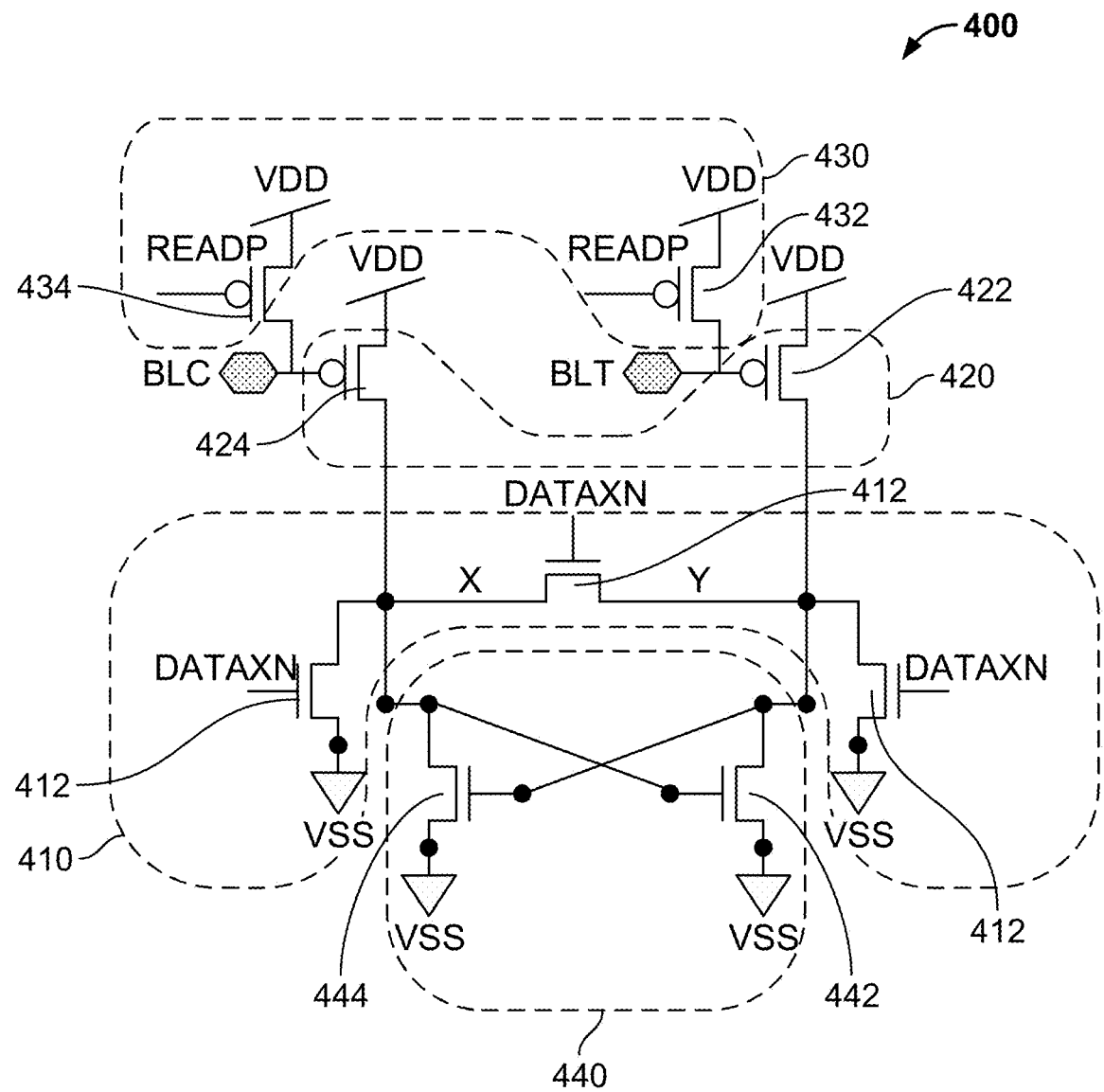
FIG. 4 depicts a schematic representation of sense amplifier circuitry for the entropy source of FIG. 1 in accordance with implementations of the subject matter of this disclosure.

FIG. 4 depicts a schematic representation of sense amplifier circuitry 400 for the entropy source 15 of FIG. 1 in accordance with implementations of the subject matter of this disclosure. It should be understood the NFETS shown in FIG. 4 may be replaced with PFETS while the PFETS shown in FIG. 4 may be replaced with NFETS in a complementary design. The sense amplifier circuitry 400 may include a voltage equalizing stage 410, a pull-up stage 420, a pre-charge stage 430, and a voltage hold stage 440. In an array structure having multiple bitline columns and multiple wordline rows, each bitline column may be coupled to sense amplifier circuitry 400.

The sense amplifier circuitry 400 operates as follows during a read operation of the bitcell 300 (FIG. 3). Initially, NFET transistors 412 of the voltage equalizing stage 410 that are controlled by a control signal DATAXN discharge node X and node Y to VSS, which is ground, and shunt the node X and the node Y together to equalize. Once the BLT voltage of the bitline true BLT and the BLC voltage of the bitline complement BLC approach their DC operating points as discussed above, it is time for the sense amplifier circuitry 400 to sense the bitline true BLT and the bitline complement BLC. Now, the control signal DATAXN transitions from VDD (active) to VSS (inactive). Next, PFET transistor 422 of the pull-up stage 420 pulls up the node Y based on the BLT voltage of the bitline true BLT while PFET transistor 424 of the pull-up stage 420 pulls up the node X based on the BLC voltage of the bitline complement BLC. More specifically, the PFET transistor 422 races the PFET transistor 424 to pull up the respective nodes to VDD. Depending on the overdrive of the PFET transistor 422 and the PFET transistor 424, either node X or node Y will reach an NFET threshold voltage first, reinforcing a read state, which is based on the voltage of the faster node to the NFET threshold voltage, by pulling the other node (or slower node to the NFET threshold voltage) to VSS. The sense amplifier circuitry 400 is then able to output a logic 1 on one node of the node X or the node Y and to output a logic 0 on the other node.

Further, PFET transistor 432 and PFET transistor 434 of the pre-charge stage 430 that are controlled by a control signal READP restore the bitline true BLT and the bitline complement BLC to VDD. The control signal READP swings from VDD (inactive) to VSS (active). Also, NFET transistor 442 and NFET transistor 444 of the voltage hold stage 440 hold the node X and the node Y at VSS in preparation for a next read operation.

Figure 5:
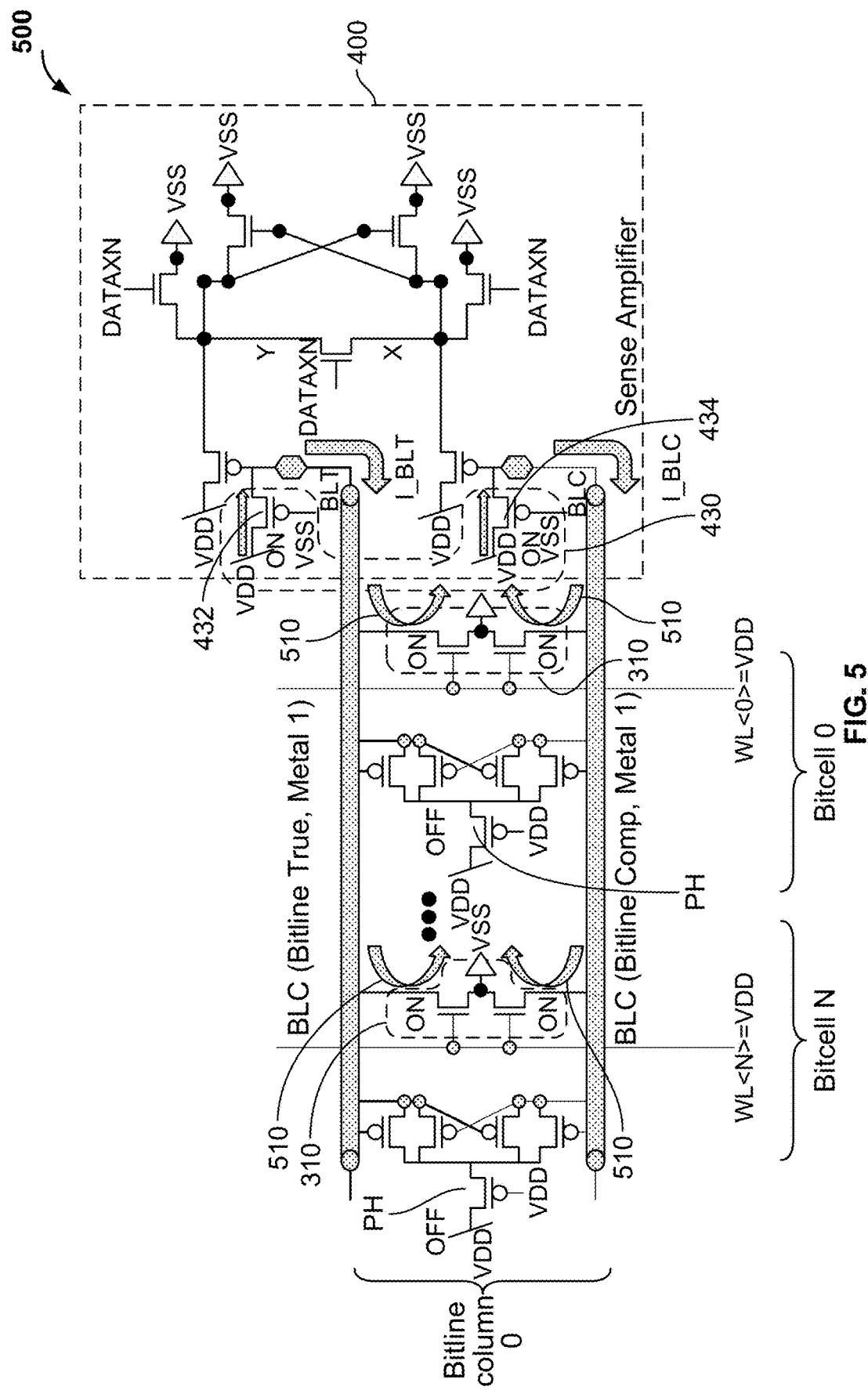
FIG. 5 illustrates a schematic representation of a portion of an array for the entropy source of FIG. 1 with electromigration-inducing circuitry to damage the entropy source in accordance with implementations of the subject matter of this disclosure.

FIG. 5 illustrates a schematic representation of a portion of an array 500 for the entropy source 15 of FIG. 1 with electromigration-inducing circuitry to damage the entropy source 15 in accordance with implementations of the subject matter of this disclosure. More specifically, FIG. 5 shows a bitline column 0 of the array 500 for the entropy source 15, where the bitline column 0 includes bitcells 0-N, where each bitcell includes the bitcell 300 (FIG. 3). Also, the bitline column 0 is coupled to the sense amplifier circuitry 400. The array 500 may have multiple bitline columns and N wordline rows. In accordance with implementations of the subject matter of this disclosure, the array 500 includes a 1 Kb (1024 bit) array for the entropy source 15 based on a mux-1 architecture, where the array is organized as 16 bitcells per bitline column (CPBL) and 64 bitcells per wordline row (CPWL).

Electromigration refers to a gradual degradation of metal interconnects due to combined effects of current and temperature. Characteristics of electromigration failure include relatively large increases in resistance, e.g., up to 20% increase in resistance, deposition of atoms referred to as hillocks that result in a short with nearby components, and depletion of atoms referred to as voids that result in an open circuit.

Self-destruction of the semiconductor device by electromigration may be localized to a region of the semiconductor device. This benefits the semiconductor device by targeting specific bits that should be damaged without impacting any other bits. For example, the targeted specific bits may represent more important information than the information represented by the other bits or may make retrieval of the other bits impractical or impossible. In accordance with implementations of the subject matter of this disclosure, electromigration is induced to damage one or more bits of the array 500 for the entropy source 15 (FIG. 1) without damaging the entirety of the semiconductor device. Consequently, the damaged entropy source 15 (FIG. 1) is rendered inoperative to provide an entire sequence of physical unclonable function information 17 (FIG. 1), e.g., a sequence of bits, for generating the unique device secret key 19 (FIG. 1) necessary to successfully execute a security protocol of the semiconductor device, preventing access to the secured information of the semiconductor device.

The area of interconnect is typically fixed based on the design of the array 500 for the entropy source 15 (FIG. 1). Further, temperature may vary depending on the use location and environment of the semiconductor device. Thus, a main lever for inducing electromigration is by controlling the current along the interconnect. For both the unique device secret key 19 (FIG. 1) generation by the physical unclonable function generator 10 (FIG. 1) and authentication to occur successfully, bitcells 0-N are each sensed individually using the sense amplifier circuitry 400. If the connections between the bitcells 0-N and the sense amplifier circuitry 400 are physically damaged or broken, it prevents reading the entire sequence of physical unclonable function information 17 (FIG. 1) out of the array 500, where the entire sequence of physical unclonable function information 17 (FIG. 1) is required for generating the unique device secret key 19 (FIG. 1). To induce electromigration to damage or break the interconnects requires generation of relatively high current densities that are sustained for some duration of time.

Returning to FIG. 5, electromigration-inducing circuitry within the array 500 for the entropy source 15 (FIG. 1) operates as follows. As noted above, one or more bitcells 0-N and the sense amplifier circuitry 400 implement the electromigration-inducing circuitry. More specifically, the NFET transistors of the differential transistor pair 310 of each bitcell 0-N of bitline column 0 of the array 500 for the entropy source 15 (FIG. 1) are reused as pull-down NFET transistors to sink a current 510. To source current for the NFET transistors of the differential transistor pair 310, PFET transistor 432 and PFET transistor 434 of the pre-charge stage 430 of the sense amplifier circuitry 400 are reused to source bitline true current I_BLT through the bitline true BLT and to source bitline complement current I_BLC through the bitline complement BLC, respectively. The bitline true BLT and the bitline complement BLC represent a bitline pair for the bitline column 0.

Control signals for the NFET transistors of the differential transistor pair 310 and the PFET transistor 432 and the PFET transistor 434 of the pre-charge stage 430 may be derived from the lock control signal 32 (FIGS. 1-2) of the safety lock circuitry 30 (FIGS. 1-2). If the lock control signal 32 is in the locked state, neither electromigration nor latch-up may be performed. At this time, control signals for the NFET transistors of the differential transistor pair 310 and the PFET transistor 432 and the PFET transistor 434 of the pre-charge stage 430 are inactive.

When the lock control signal 32 transitions to the unlocked state, electromigration or latch-up, or both, may be performed. Next, gates of the NFET transistors of the differential transistor pair 310 in each bitcell 0-N in the bitline column 0 are activated to a logic 1 (or VDD). Meanwhile, gate of the bitcell selection transistor PH in each bitcell 0-N in the bitline column 0 is held at VDD to cut off the bitcell selection transistor PH. Within the sense amplifier circuitry 400, the PFET transistor 432 and the PFET transistor 434 of the pre-charge stage 430 are activated by controlling the gate of the PFET transistor 432 and the PFET transistor 434 to a logic 0 (or VSS). The activation of the electromigration on the metal interconnect of the bitline true BLT and the bitline complement BLC creates a distributed RC network in which a relatively high current is stretched along a length of the bitline pair. The length of wire of the bitline pair is determined by width and quantity of bitcells. Long, narrow wires have relatively higher resistance and are considered a higher risk for the occurrence of electromigration. Once a void is formed due to electromigration, the resistance significantly increases and a path for current is eliminated, terminating the electromigration operation. The physically damaged bitline pair prevents access to any one of the bitcells 0-N along the damaged bitline pair. This type of self-destruction is localized, permitting selection of bitline pairs in the array 500 to be destroyed with no adverse effects on other bitline pairs in the array 500. Depending on the current limits of a power source, electromigration may be attempted on multiple bitline pairs in parallel over multiple bitline columns, or even on the entire array 500.

Since the NFET transistors of the differential transistor pair 310 are used as a distributed pull-down network for electromigration, the self-heating of the NFET transistors of the differential transistor pair 310 help radiate heat and increase the temperature. In turn, the resistance of the bitline pairs also increases.

At a small area expense, an additional pull-down NFET transistor may be coupled, opposite the sense amplifier circuitry 400, to each one of the bitline true BLT and the bitline complement BLC of the bitline pair. Instead of activating simply the NFET transistors of the differential transistor pair 310 of each bitcell 0-N, the additional pull-down NFET transistors sink current across the entire length of the bitline pair. This additional pull-down current increases a current density through the bitline pair.

Electromigration causes damage to at least one bitline of the bitline pair in the entropy source 15. This prevents performance of one or more read operations directed to the bitcells 0-N in the entropy source 15. The one or more read operations are needed to supply the entire sequence of physical unclonable function information 17 (FIG. 1) for generating the unique device secret key 19 (FIG. 1) necessary to successfully execute a security protocol of the semiconductor device, preventing access to the secured information of the semiconductor device. Moreover, electromigration involves generating a current above a damage threshold and sustaining the current above the damage threshold for at least a threshold duration to damage at least one bitline of the bitline pair that connects the bitcells 0-N and the sense amplifier circuitry 400.

Figure 6:
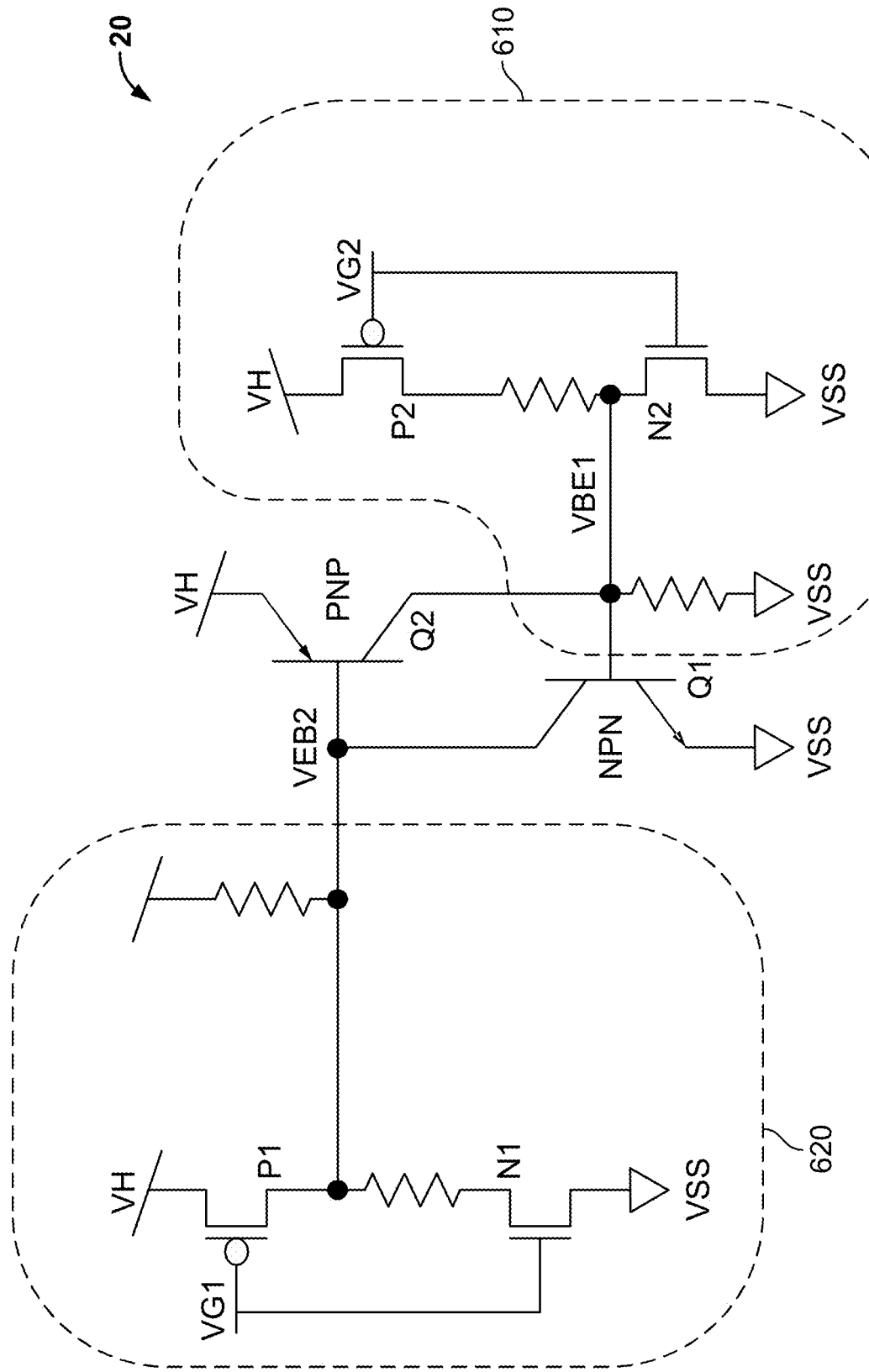
FIG. 6 depicts a schematic representation of the latch-up inducing circuitry of FIG. 1 to damage a power grid of the semiconductor device in accordance with implementations of the subject matter of this disclosure.

FIG. 6 depicts a schematic representation of the latch-up inducing circuitry 20 of FIG. 1 to damage the power grid of the semiconductor device in accordance with implementations of the subject matter of this disclosure. In some scenarios, self-destruction with global impact on the semiconductor device may be required to prevent unauthorized access to secured information of the semiconductor device. Self-destruction with global impact may be more effective when compared to electromigration which is intended to cause localized damage, e.g., damage isolated to the entropy source 15 (FIG. 1), without impacting the entirety of the semiconductor device. Latch-up is self-sustaining and, within a relatively short period of time, results in a short-circuit event between a power line and a ground line of the power grid that is irreversible and catastrophic. That is, self-destruction by inducing latch-up causes global damage instead of localized damage. The latch-up inducing circuitry 20 allows for a controllable activation of latch-up.

The latch-up inducing circuitry 20 may include an NPN bipolar junction transistor Q1 and a PNP bipolar junction transistor Q2 in a loop arrangement, a first biasing circuitry 610 operable to bias the NPN bipolar junction transistor Q1, and a second biasing circuitry 620 operable to bias the PNP bipolar junction transistor Q2. Further, a higher voltage than VDD is coupled to the latch-up inducing circuitry 20. The higher voltage may be 1.8 volts or may be a different selected voltage value. The purpose for the higher voltage is to forward bias the NPN bipolar junction transistor Q1 and the PNP bipolar junction transistor Q2.

Latch-up inducing circuitry 20 operates as follows. NFET transistor N2 of the first biasing circuitry 610 and PFET transistor P1 of the second biasing circuitry 620 precharge and hold a base terminal voltage VBE1 of the NPN bipolar junction transistor Q1 and a base terminal voltage VEB2 of the PNP bipolar junction transistor Q2 in cut-off, respectively. Control signal VG1 for the second biasing circuitry 620 and control signal VG2 for the first biasing circuitry 610 are complementary and may be derived from the lock control signal 32 (FIGS. 1-2) of the safety lock circuitry 30 (FIGS. 1-2). Since the lock control signal 32 is in the locked state, neither electromigration nor latch-up may be performed. At this time, the control signal VG1 is set to a logic 0 while the control signal VG2 is set to a logic 1.

When the lock control signal 32 transitions to the unlocked state, electromigration or latch-up, or both, may be performed. Now, the control signal VG1 transitions to a logic 1 while the control signal VG2 transitions to a logic 0. PFET transistor P2 of the first biasing circuitry 610 configures the first biasing circuitry 610 into a resistor divider network to bias the base terminal voltage VBE1 to configure the NPN bipolar junction transistor Q1 in the forward active region of operation. NFET transistor N1 of the second biasing circuitry 620 configures the second biasing circuitry 620 into a resistor divider network to bias the base terminal voltage VEB2 to configure the PNP bipolar junction transistor Q2 in the forward active region of operation. At this time, a self-sustaining positive feedback loop is created between the NPN bipolar junction transistor Q1 and the PNP bipolar junction transistor Q2, inducing latch-up to cause catastrophic damage to the power grid. That is, a current is sent between the power and ground lines through the self-sustaining positive feedback loop while uncontrollably increasing the current to heat the semiconductor device and to exceed the current tolerance threshold of the semiconductor device. This impacts the entirety of the semiconductor device.

Figure 7:
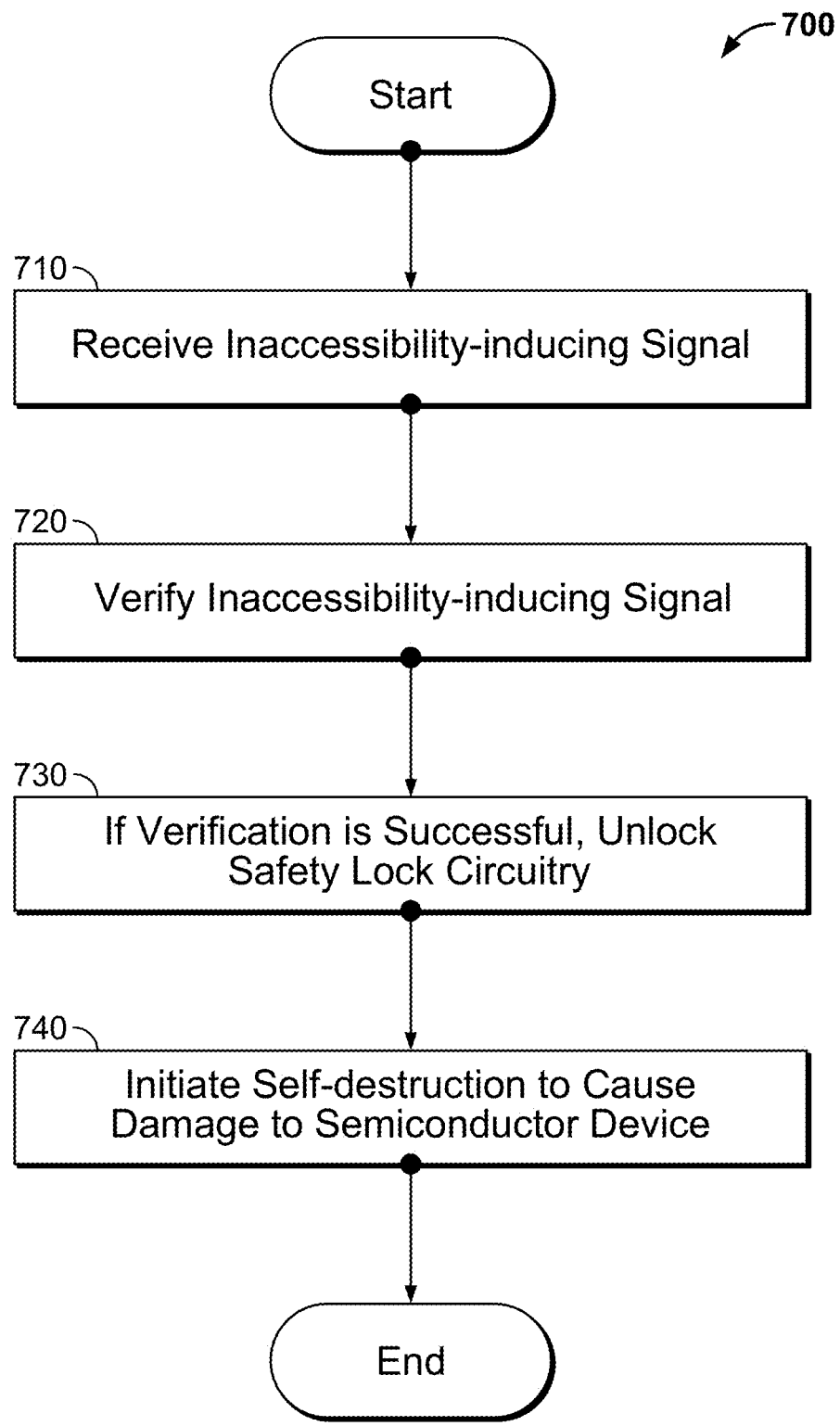
FIG. 7 shows a flow diagram illustrating a technique in accordance with implementations of the subject matter of this disclosure for inducing self-destruction in a semiconductor device to cause damage to prevent unauthorized access to secured information.

FIG. 7 shows a flow diagram illustrating a technique 700 in accordance with implementations of the subject matter of this disclosure for inducing self-destruction in a semiconductor device to cause damage to prevent unauthorized access to secured information.

The technique 700 begins at 710, where an inaccessibility-inducing signal to trigger self-destruction is received, as described above in connection with FIG. 1. Next, at 720, the inaccessibility-inducing signal is verified, as explained above in connection with FIG. 1. At 730, if the verification is successful, the safety lock circuitry 30 is unlocked, as described above in connection with FIGS. 1-2. Otherwise, the inaccessibility-inducing signal is ignored. Next, at 740, self-destruction to cause damage to the semiconductor device is initiated to prevent unauthorized access to the secured information of the semiconductor device. Inducement of electromigration, latch-up, or both may be performed to damage the semiconductor device.

Thus, it is seen that method and apparatus for inducing self-destruction to cause damage to an entropy source of the physical unclonable function generator and/or a different component of the semiconductor device to prevent unauthorized access to the secured information of the semiconductor device and that self-destruction using the electromigration-inducing circuitry and the latch-up inducing circuitry, have been provided.

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for preventing unauthorized access to information in a semiconductor device that is secured with a security protocol that uses a first portion of the information, where the semiconductor device includes an entropy source and a power grid configured to power the semiconductor device, the method comprising:
   in response to a verified inaccessibility-inducing signal, unlocking safety lock circuitry which is operable to prevent unintentional activation of self-destruction in the semiconductor device; and
   initiating the self-destruction of at least a portion of at least one of the entropy source or the power grid; and
   performing the self-destruction of the at least a portion of the semiconductor device by utilizing at least a portion of the entropy source to damage the entropy source or utilizing at least a portion of the power grid to damage the power grid.

2. The method of claim 1, wherein unlocking the safety lock circuitry in response to the verified inaccessibility-inducing signal comprises unlocking the safety lock circuitry in response to a signal indicative of tampering in the semiconductor device having been detected.

3. The method of claim 1, wherein unlocking the safety lock circuitry in response to the verified inaccessibility-inducing signal comprises unlocking the safety lock circuitry in response to an external command received by the semiconductor device to render the information inaccessible.

4. The method of claim 1, wherein:
   the entropy source is configured to be operable to provide the first portion of the information which is necessary to execute the security protocol;
   initiating the self-destruction comprises inducing a failure mode of the entropy source to prevent performance of one or more read operations directed to the first portion of the information; and
   performing the self-destruction of the at least a portion of the semiconductor device comprises performing the self-destruction of the at least a portion of the entropy source by utilizing the entropy source.

5. The method of claim 4, wherein inducing the failure mode comprises inducing electromigration in the entropy source to damage at least one bitline of at least one bitline pair of the entropy source to prevent performance of the one or more read operations directed to the first portion of the information.

6. The method of claim 5, wherein inducing the electromigration in the entropy source is performed on the at least one bitline pair of the entropy source by one or more bitcells and sense amplifier circuitry of the entropy source, wherein inducing the electromigration in the entropy source renders the entropy source inoperative to entirely provide the first portion of the information which is necessary to execute the security protocol to permit access to the semiconductor device, and wherein inducing the electromigration in the entropy source is performed without damaging the entirety of the semiconductor device.

7. The method of claim 6, wherein inducing the electromigration in the entropy source is further performed on the at least one bitline pair by a plurality of pull-down transistors of the entropy source in coordination with the one or more bitcells and the sense amplifier circuitry, and wherein inducing the electromigration comprises:
   generating a current above a damage threshold; and
   sustaining the current above the damage threshold for at least a threshold duration to damage the at least one bitline of the at least one bitline pair that connects the one or more bitcells and the sense amplifier circuitry.

8. The method of claim 1, wherein initiating the self-destruction comprises inducing latch-up in the power grid of the semiconductor device, by:
   creating a self-sustaining positive feedback loop between power and ground lines of the semiconductor device;
   sending a current between the power and ground lines of the semiconductor device through the self-sustaining positive feedback loop; and
   uncontrollably increasing the current to heat the semiconductor device and to exceed a current tolerance threshold of the semiconductor device to damage at least one of the power or ground lines.

9. The method of claim 8, wherein inducing the latch-up in the power grid of the semiconductor device comprises rendering the semiconductor device inoperative due to at least one of the power or ground lines having been damaged.

10. The method of claim 8, wherein inducing the latch-up in the power grid of the semiconductor device comprises using latch-up inducing circuitry of the semiconductor device to create the self-sustaining positive feedback loop between the power and ground lines of the semiconductor device, to send the current between the power and ground lines through the self-sustaining positive feedback loop, and to uncontrollably increase the current to heat the semiconductor device and to exceed the current tolerance threshold of the semiconductor device.

11. The method of claim 1, wherein initiating the self-destruction comprises:
  damaging the first portion of the information, wherein the first portion of the information comprises physical unclonable function information that represents random and unique unstored bits obtainable from variation in semiconductor component intrinsic properties due to semiconductor fabrication processes, the physical unclonable function information being necessary to execute the security protocol, and wherein a second portion of the information is rendered inaccessible due to the physical unclonable function information having been damaged.

12. The method of claim 1, wherein initiating the self-destruction comprises causing the information to be permanently inaccessible by rendering the semiconductor device inoperative to power up and to perform at least one operation due to damage to the power grid of the semiconductor device.

13. A semiconductor device configured to prevent unauthorized access to information available therein that is secured with a security protocol that uses a first portion of the information, the semiconductor device comprising:
  an entropy source;
  a power grid configured to power the semiconductor device;
  safety lock circuitry operable to prevent unintentional activation of self-destruction in the semiconductor device; and
  control circuitry operable to:
  unlock the safety lock circuitry and to initiate the self-destruction of at least a portion of the semiconductor device in response to a verified inaccessibility-inducing signal, and
  perform the self-destruction of the at least a portion of the semiconductor device by utilizing at least a portion of the entropy source to damage the entropy source or utilizing at least a portion of the power grid to damage the power grid.

14. The semiconductor device of claim 13, wherein the verified inaccessibility-inducing signal comprises a signal indicative of tampering in the semiconductor device having been detected.

15. The semiconductor device of claim 13, wherein the verified inaccessibility-inducing signal comprises an external command received by the semiconductor device to render the information inaccessible.

16. The semiconductor device of claim 13, wherein:
  the entropy source is further configured to be operable to provide the first portion of the information which is necessary to execute the security protocol; and
  the control circuitry is operable to initiate the self-destruction by inducing a failure mode of the entropy source to prevent performance of one or more read operations directed to the first portion of the information, and to perform the self-destruction of the at least a portion of the semiconductor device by utilizing the at least a portion of the entropy source to damage the entropy source.

17. The semiconductor device of claim 16, wherein the control circuitry is operable to induce the failure mode of the entropy source by inducing electromigration in the entropy source to damage at least one bitline of at least one bitline pair of the entropy source to prevent performance of the one or more read operations directed to the first portion of the information.

18. The semiconductor device of claim 17, wherein the control circuitry is operable to induce the electromigration in the entropy source by performance of the electromigration on the at least one bitline pair of the entropy source by one or more bitcells and sense amplifier circuitry of the entropy source, wherein the control circuitry is operable to induce the electromigration to render the entropy source inoperative to entirely provide the first portion of the information which is necessary to execute the security protocol to permit access to the semiconductor device, and wherein the control circuitry is operable to induce the electromigration in the entropy source without damaging the entirety of the semiconductor device.

19. The semiconductor device of claim 18, wherein the control circuitry is operable to induce the electromigration in the entropy source by further performance of the electromigration on the at least one bitline pair by a plurality of pull-down transistors of the entropy source in coordination with the one or more bitcells and the sense amplifier circuitry, by:
  causing generation of a current above a damage threshold; and
  causing the current to be sustained above the damage threshold for at least a threshold duration to damage the at least one bitline of the at least one bitline pair that connects the one or more bitcells and the sense amplifier circuitry.

20. The semiconductor device of claim 13, wherein the control circuitry is operable to initiate the self-destruction by inducing latch-up in the power grid of the semiconductor device, by:
  causing creation of a self-sustaining positive feedback loop between power and ground lines of the semiconductor device;
  causing a current to be sent between the power and ground lines of the semiconductor device through the self-sustaining positive feedback loop; and
  causing the current to uncontrollably increase to heat the semiconductor device and to exceed a current tolerance threshold of the semiconductor device to damage at least one of the power or ground lines.

21. The semiconductor device of claim 20, wherein the control circuitry is operable to induce the latch-up to render the semiconductor device inoperative due to at least one of the power or ground lines having been damaged.

22. The semiconductor device of claim 20, further comprising latch-up inducing circuitry operable to create the self-sustaining positive feedback loop between the power and ground lines of the semiconductor device, to send the current between the power and ground lines through the self-sustaining positive feedback loop, and to uncontrollably increase the current to heat the semiconductor device and to exceed the current tolerance threshold of the semiconductor device, wherein the control circuitry is operable to use the latch-up inducing circuitry, and wherein the latch-up inducing circuitry comprises a PNP bipolar junction transistor and a NPN bipolar junction transistor in a loop arrangement, a first biasing circuitry operable to receive control signals, to bias the PNP bipolar junction transistor in an inactive state, and to bias the PNP bipolar junction transistor in an active state to induce the latch-up, and a second biasing circuitry operable to receive the control signals, to bias the NPN bipolar junction transistor in the inactive state, and to bias the NPN bipolar junction transistor in the active state to induce the latch-up.

23. The semiconductor device of claim 13, wherein the first portion of the information is damaged by the self-destruction, wherein the first portion of the information comprises physical unclonable function information that represents random and unique unstored bits obtainable from variation in semiconductor component intrinsic properties due to semiconductor fabrication processes, the physical unclonable function information being necessary to execute the security protocol, and wherein a second portion of the information is rendered inaccessible due to the physical unclonable function information having been damaged.

24. The semiconductor device of claim 13, wherein the information is made permanently inaccessible by the self-destruction by rendering the semiconductor device inoperative to power up and to perform at least one operation due to damage to the power grid of the semiconductor device.

25. The semiconductor device of claim 13, wherein the safety lock circuitry comprises:
   multi-stage ring oscillator circuitry operable to generate a plurality of pulses, wherein the multi-stage ring oscillator circuitry includes enable circuitry operable to receive the plurality of pulses and a first control signal;
   a first plurality of power on zero (POZ) latches positioned in a first series arrangement operable to receive the plurality of pulses and to generate a first plurality of output values;
   a second plurality of POZ latches positioned in a second series arrangement operable to receive a clock signal and an activate self-destruction signal and to generate a second plurality of output values;
   first circuitry operable to receive the first plurality of output values and to generate the first control signal to couple to the enable circuitry of the multi-stage ring oscillator circuitry and to respective reset terminals of the second plurality of POZ latches; and
   second circuitry operable to receive the second plurality of output values and to generate an unlock signal, wherein the second circuitry is operable to set the unlock signal to an unlock value in response to the activate self-destruction signal being a first value for a plurality of clock cycles of the clock signal in the second plurality of POZ latches and the respective reset terminals of the second plurality of POZ latches being inactive.

26. A semiconductor device configured to prevent unauthorized access to information available therein that is secured with a security protocol that uses a first portion of the information, the semiconductor device comprising:
   a power grid configured to power the semiconductor device;
   an entropy source operable to provide the first portion of the information which is necessary to execute the security protocol;
   at least one of electromigration-inducing circuitry or latch-up inducing circuitry to perform self-destruction of the semiconductor device, wherein:
      the electromigration-inducing circuitry is configured within the entropy source and is operable to damage the entropy source to prevent performance of one or more read operations and to render the entropy source inoperative to entirely provide the first portion of the information which is necessary to execute the security protocol to permit access to the semiconductor device, and
      the latch-up inducing circuitry is configured within the power grid and is operable to damage the power grid and to render the semiconductor device inoperative to power up and to perform at least one operation;
   safety lock circuitry operable to prevent unintentional activation of the at least one of electromigration-inducing circuitry or latch-up inducing circuitry to perform the self-destruction in the semiconductor device; and
   control circuitry operable to unlock the safety lock circuitry in response to a verified inaccessibility-inducing signal.

* * * * *